(12) United States Patent
Hasan et al.

(10) Patent No.: US 12,233,762 B2
(45) Date of Patent: Feb. 25, 2025

(54) TWO FUNCTION MECHANISM TO ENABLE TWO MODES OF OPERATION OF A VEHICULAR SEAT

(71) Applicant: Mobius Protection Systems Ltd., Hevel Modiln Industrial Park (IL)

(72) Inventors: Anan Hasan, Julis (IL); Oren Goor, Savyon (IL); Shy Mindel, Hod-HaSharon (IL)

(73) Assignee: Mobius Protection Systems Ltd., Hevel Modiln Industrial Park (IL)

( * ) Notice: Subject to any disclaimer, the term of this patent is extended or adjusted under 35 U.S.C. 154(b) by 233 days.

(21) Appl. No.: 18/096,084

(22) Filed: Jan. 12, 2023

(65) Prior Publication Data
US 2023/0226958 A1    Jul. 20, 2023

(30) Foreign Application Priority Data
Jan. 12, 2022    (IL) .......................................... 289818

(51) Int. Cl.
*B60N 2/42*    (2006.01)
*B60N 2/427*    (2006.01)
*B64D 11/06*    (2006.01)

(52) U.S. Cl.
CPC ....... *B60N 2/4242* (2013.01); *B60N 2/42709* (2013.01); *B60N 2/42736* (2013.01); *B64D 11/0619* (2014.12)

(58) Field of Classification Search
CPC .............. B60N 2/4242; B60N 2/42709; B60N 2/42736; B64D 11/0619
See application file for complete search history.

(56) References Cited

U.S. PATENT DOCUMENTS

| | | | |
|---|---|---|---|
| 9,969,307 B1 | 5/2018 | Bosen | |
| 10,166,889 B1 | 1/2019 | Lou et al. | |
| 10,427,564 B2 * | 10/2019 | Mindel | B60N 2/42736 |
| 2016/0068085 A1 | 3/2016 | Mindel et al. | |

OTHER PUBLICATIONS

Grant Notification PK11 Publication in Yoman of Nov. 2022 on Dec. 1, 2022 From the Israel Patent Office Re. Application No. 289818 (29 Pages).
Office Action and Searcch Report Dated Jul. 7, 2022 From the Israel Patent Office Re. Application No. 289818. (8 Pages).

* cited by examiner

*Primary Examiner* — Syed A Islam

(57) ABSTRACT

A mechanism disposed between a frame structure and a base structure, the mechanism comprising a damper including a piston rod. The damper is mechanically connected between the frame structure and the base structure in a normal mode of operation. The damper enables a longitudinal and suspended upward and downward movement of the frame perpendicular to a plane. An energy-absorbing arrangement that includes a plastically deformable absorbing element. The plastically deformable absorbing element is adapted to plastically deform in response to stresses greater than a predetermined threshold stress along an axis perpendicular to the plane. A bar mechanically attached to the plastically deformable absorbing element and having an engagement portion.

10 Claims, 9 Drawing Sheets

TWO FUNCTION MECHANISM TO ENABLE TWO MODES OF OPERATION OF A VEHICULAR SEAT

RELATED APPLICATION(S)

This application claims the benefit of priority of Israel Patent Application No. 289818 filed on Jan. 12, 2022, the contents of which are incorporated by reference as if fully set forth herein in their entirety.

BACKGROUND

The present disclosure, in some embodiments thereof, relates to a mechanism operable in two modes and, more specifically to the mechanism located between a frame structure and a base structure, but not exclusively, to two modes to provide a suspension feature to a passenger and a protection feature to the passenger.

Travel fatigue is more likely to be felt on a road trip when compared to, for example, to travel by road. Because traveling on a road, a vehicle accelerates and decelerates frequently. The vehicle may also take various turns that sways a passenger from one side to another, causing bodily stress. Further, in on off road situation, bodily stress may be further increased because of the bumpy terrain. The condition of a vehicle, its suspension and its seats often determine the level of comfort that a passenger experiences. In sum, the above-mentioned movements make the passengers muscles work continuously to leave them tired at the end of a journey.

A danger to travel is the presence of improvised explosive devices (IEDs) or mortars fired at the vehicle. In such cases further protection to a passenger may be necessary which may be more suitable than the regular suspension and condition of the vehicle may provide.

SUMMARY

It is an object of the present invention to provide an apparatus operable in two modes and, more specifically to the mechanism located between a frame structure and a base structure, but not exclusively, to two modes to provide a suspension feature to a passenger and a protection feature to the passenger.

A mechanism disposed between a frame structure and a base structure, the mechanism comprising a damper including a piston rod. The damper is mechanically connected between the frame structure and the base structure in a normal mode of operation. The damper enables a longitudinal and suspended upward and downward movement of the frame perpendicular to a plane. An energy-absorbing arrangement that includes a plastically deformable absorbing element. The plastically deformable absorbing element is adapted to plastically deform in response to stresses greater than a predetermined threshold stress along an axis perpendicular to the plane. A bar mechanically attached to the plastically deformable absorbing element and having an engagement portion.

A locking mechanism attached to the frame structure. The locking mechanism including a pivot perpendicularly attached through the base structure. A plate including a second engagement portion rotationally attached to the pivot. Responsive to an explosion, the plate is rotated about the pivot to provide an engagement of the second engagement portion with the first engagement portion to switch from the normal mode of operation to an abnormal mode of operation. In the abnormal mode of operation, the energy-absorbing arrangement is operatively connected between the frame structure and the base structure thereby, to utilize the energy absorption properties of the energy-absorbing arrangement.

A second pivot is perpendicularly attached through the base structure frame and laterally offset from the pivot. A wedge rotationally attached to the second pivot and is rotatable through the aperture of a top plate of the frame structure. The wedge further locks the engagement to utilize thereby, the energy absorption properties of the energy-absorbing arrangement. The engagement may be achieved when an acceleration of the mass is greater than 4Gs or by an adjustment of the engagement to any other acceleration value required.

An integral fuse of the energy-absorbing arrangement breaks when the load from the explosion applied to a helical portion of energy-absorbing arrangement exceeds an acceleration up to 20Gs of the longitudinal upward and downward movement of the frame structure in the plane.

The energy-absorbing arrangement may be plastically or elastically deformable in response to stresses greater than a predetermined threshold stress. The energy-absorbing arrangement is a compressible element or an extendable element. A helical ribbon of the energy-absorbing arrangement undergoes a deformation to an extent and at a stress level controllable by the length, pitch, cross section, and material of the helical ribbon.

During the abnormal mode of operation, the energy absorption of the energy-absorbing arrangement takes over the action of the damper.

In the normal mode of operation, a suspension feature is provided to a load attached to the frame structure by the damper. The load may be a seat and/or passenger of an armored vehicle.

The foregoing and other objects are achieved by the features of the independent claims. Further implementation forms are apparent from the dependent claims, the description and the figures.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
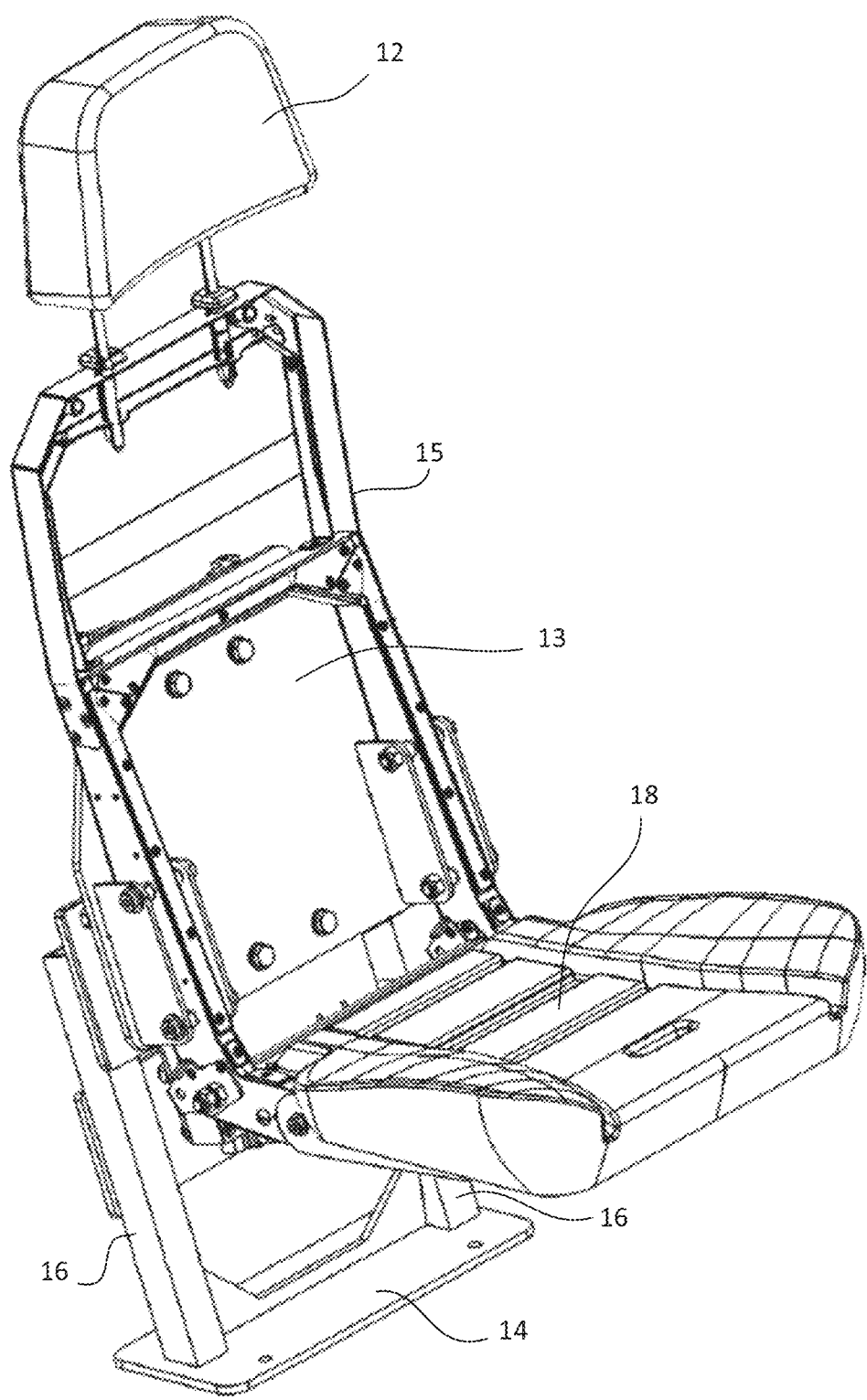
FIG. 1 shows a vehicular seat, in accordance with some embodiments.

The present disclosure, in some embodiments thereof, relates a mechanism operable in two modes and, more specifically to the mechanism located between a frame structure and a base structure, but not exclusively, to two modes to provide a suspension feature to a passenger and a protection feature to the passenger.

By way of introduction aspects of the disclosure below, describe a vehicular seat fitted in an armored fighting vehicle (AFV). The vehicular seat includes a suspension system to provide on road comfort to security personnel such as soldiers from vibrations occurring due to travelling in off-road conditions. Vibrations occurring due to travelling in off-road conditions can be harmful and cause not only discomfort but can also cause long-term injuries and fatigue. Therefore, the suspension system for the vehicular seat avoids the effect of the vibrations, so that when security personnel arrive to their destination, they are mission ready and not affected from these vibrations. The suspension system is located between the seat and a base of the seat. The base of the seat attaches to the floor of the armored fighting vehicle (AFV). The suspension system further includes a locking mechanism and an energy-absorbing arrangement. The energy-absorbing arrangement is activated by the locking mechanism to mitigate the effects on security personnel from an unforeseen explosion on the armored fighting vehicle (AFV). The unforeseen explosion causes the locking mechanism to switch to the energy-absorbing arrangement between seat and a base of the seat. The energy-absorbing arrangement therefore, takes over the function of the suspension system to apply the benefit of the energy-absorbing arrangement to the vehicular seat and security personnel sat in the vehicular seat.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways. The present disclosure may be a system and a method Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which shows a vehicular seat 10, in accordance with some embodiments. A base plate 14 is attached to two struts 16. Base plate 14 attaches to the floor of a vehicle (not shown). According to descriptions below the vehicle may be an armored vehicle used to transport security personnel for example. Vehicular seat 10 includes seat 18 that may be foldable to the vertical back 15 and lockable in the horizontal position. Back 15 is shown without a seat material to show plate 13 which is attached to back 15. Also attached to back 15 is head restraint 12.

Figure 2A:
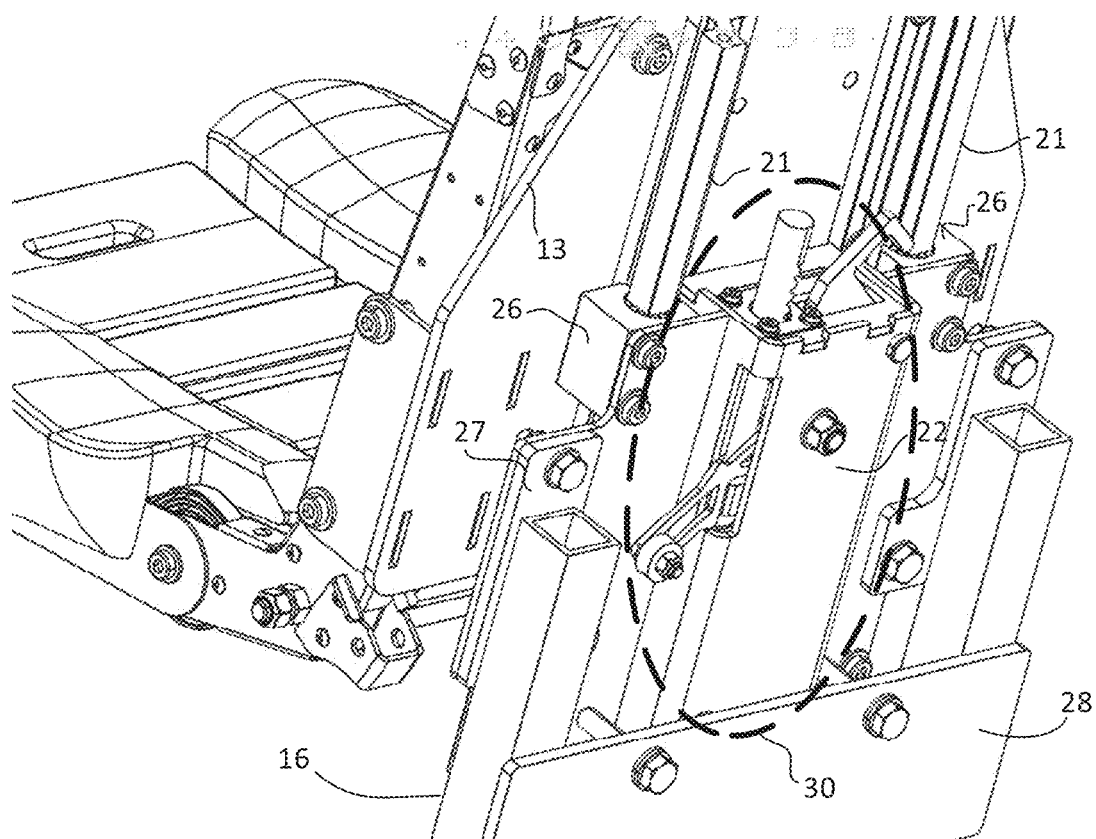
FIG. 2A and FIG. 2B show the attachment of a seat back to struts and a base plate, in accordance with some embodiments.

Reference is now made to FIG. 2A, which shows the attachment of back 15 to struts 16 and base plate 14, in accordance with some embodiments. Plate 13 is attached to back 15 and the other side of plate 13 attaches to two slide rails 21. Slide rails 21 are slide-ably attached to four linear slider bearings 26 (only top two shown) to form a seat frame of vehicular seat 10 or in general to provide a frame structure. The frame structure for example may be a shelf used to hold ammunition or explosives for example. Slider bearings 26 attach to plate 27, struts 16 are attached to plate 27 and bolted to plate 27 by plate 28. Plate 27 struts 16 and plate 28 form a base frame or a base structure of vehicular seat 10. The base frame includes mechanism 30 shown by dotted oval line. Mechanism 30 is covered by frame 22 that is attached to plate 27.

Figure 2B:
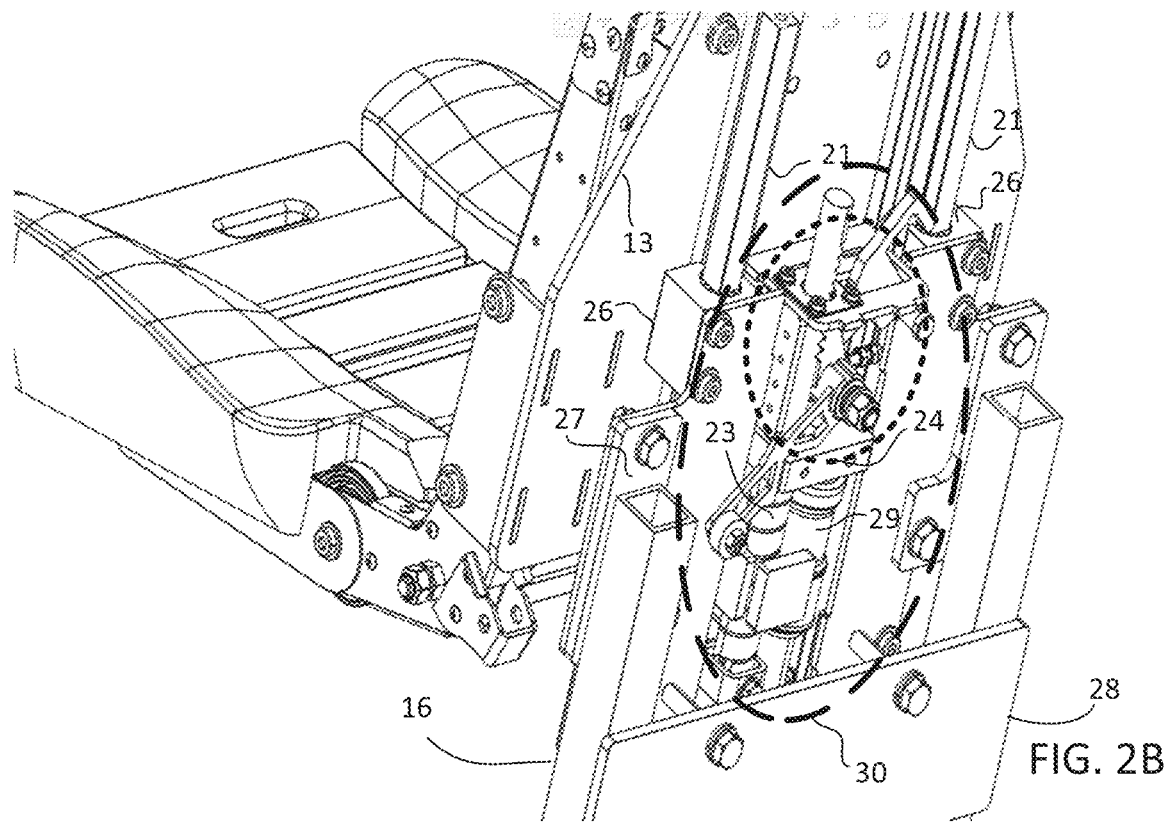

Reference is now made to FIG. 2B, which shows the attachment of back 15 to struts 16 and base plate 14, in accordance with some embodiments. FIG. 2B is the same as FIG. 2B however, frame 22 is removed to show more details of mechanism 30. Mechanism 30 includes a damper 29 or a shock absorber, one end damper 29 connects to arm 24. The other end of damper 29 attaches to the base frame formed by plate 27, struts 16 and plate 28. Laterally adjacent to damper 29 is energy-absorbing arrangement 23. One end of energy-absorbing arrangement 23 attaches to arm 24 and the other end attaches to the seat frame of vehicular seat 10. Arm 24 attaches to frame 22. With frame 22 removed, further details of locking mechanism 32 included in smaller dotted oval and are shown. The details of locking mechanism 32 are included in the descriptions that follow.

Figure 3:
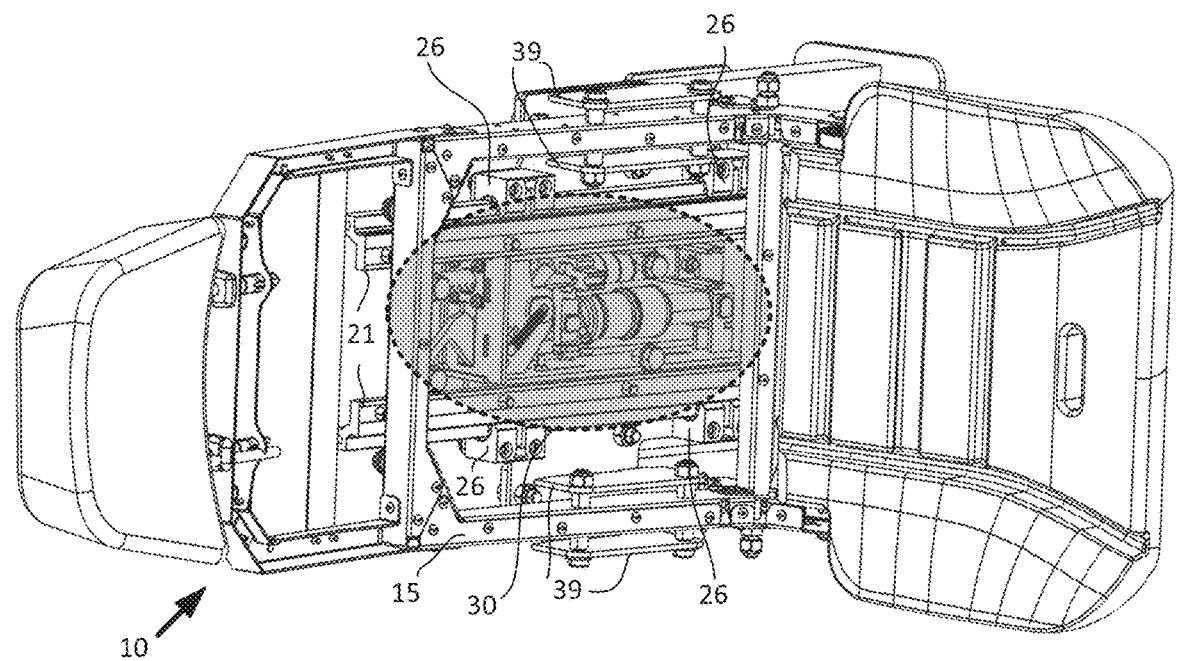
FIG. 3 shows a mechanism with a plate removed from a vehicular seat and further details of a mechanism, in accordance with some embodiments.
Figure 3:
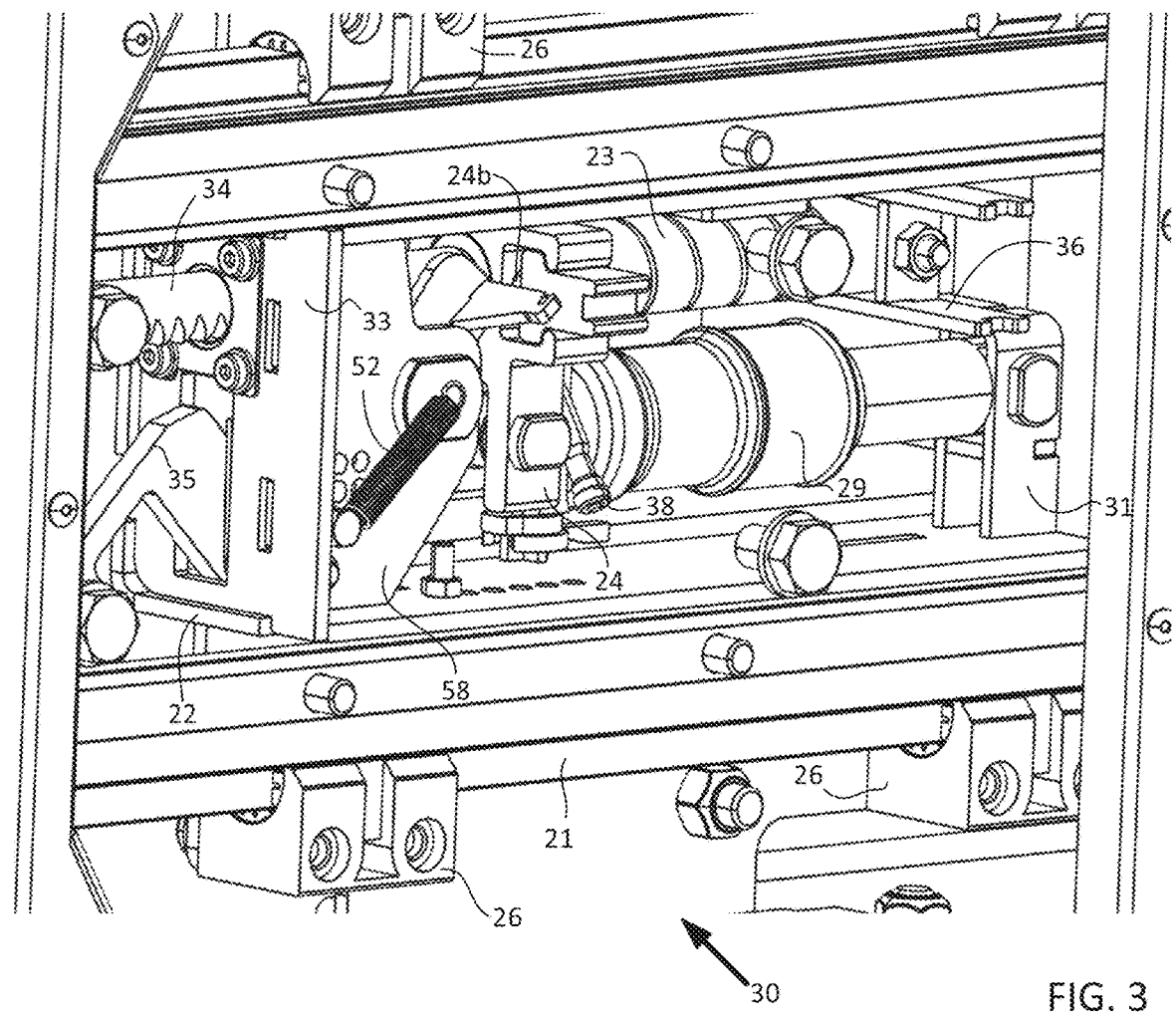

Reference is now made to FIG. 3, which shows mechanism 30 with plate 13 removed from vehicular seat 10 and further details of mechanism 30, in accordance with some embodiments. Four linear slider bearings 26 as shown which are move-ably attached to slide rails 21. Slide rails 21 are attached to plate 13. Plates 39 are bolted to back 15, plates 39 are perpendicular attached to plate 13. The further details of mechanism 30 include damper 29 attached to the base frame by base mount 31. The other end of damper 29 attaches to arm 24. Damper 29 includes a valve 38 that may be used to set the air pressure in damper 29. Valve 38, therefore enables the configuration of the suspension feature of vehicular seat 10 for when an armored vehicle is travelling off road. Energy-absorbing arrangement 23 connects to the seat frame by seat mount 36. Beyond arm 24, the fuse of energy-absorbing arrangement 23 move-ably attaches to toothed bar 34. Toothed bar 34 is an example of a linear gear rack. Bar 34 may also include a friction based clutch type surface. Toothed bar 34 and its linear movement is through the control of locking mechanism 32. Locking mechanism 32 includes, wedge 35, spring 52 and top plate 33 that is attached perpendicular to frame 22.

Figure 4A:
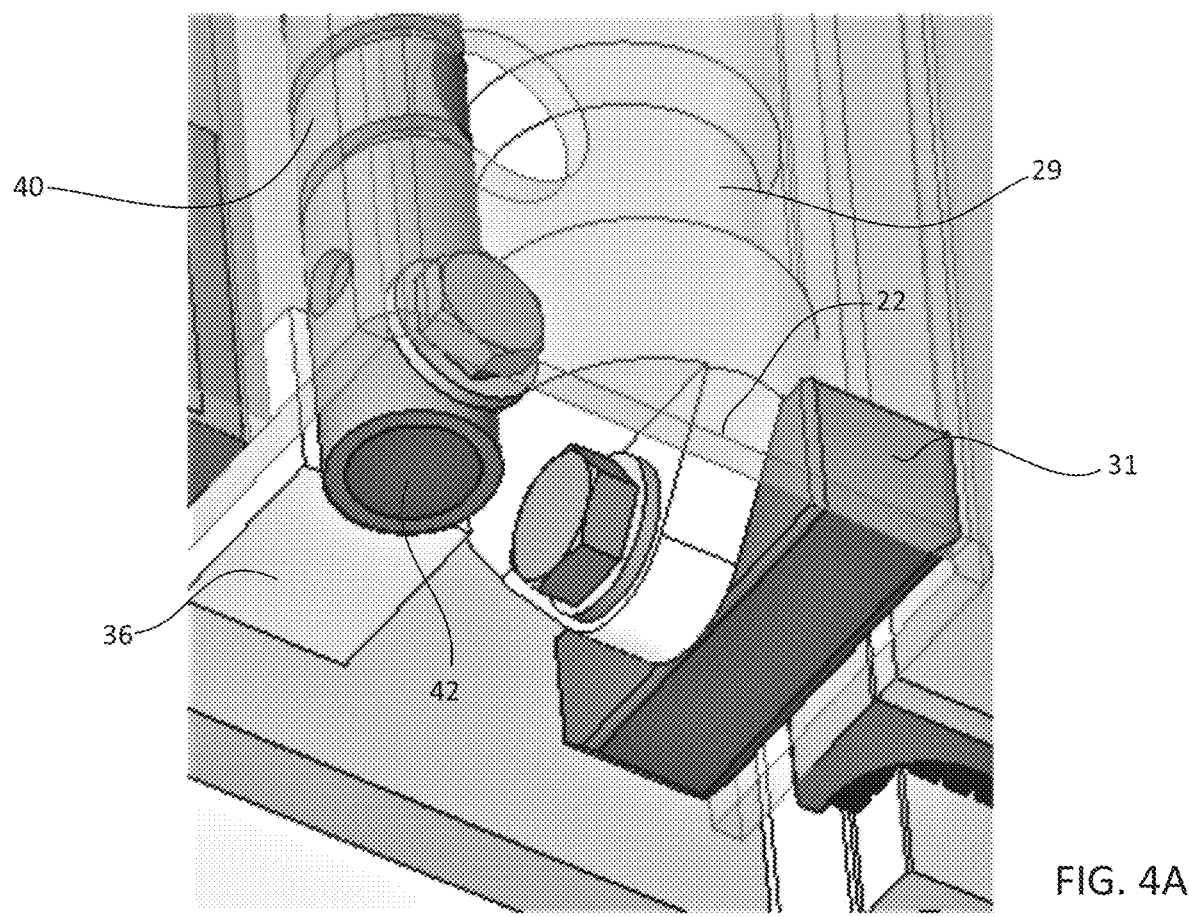
FIG. 4A and FIG. 4B show further details of a seat mount and a base mount, in accordance with some embodiments.
Figure 4B:
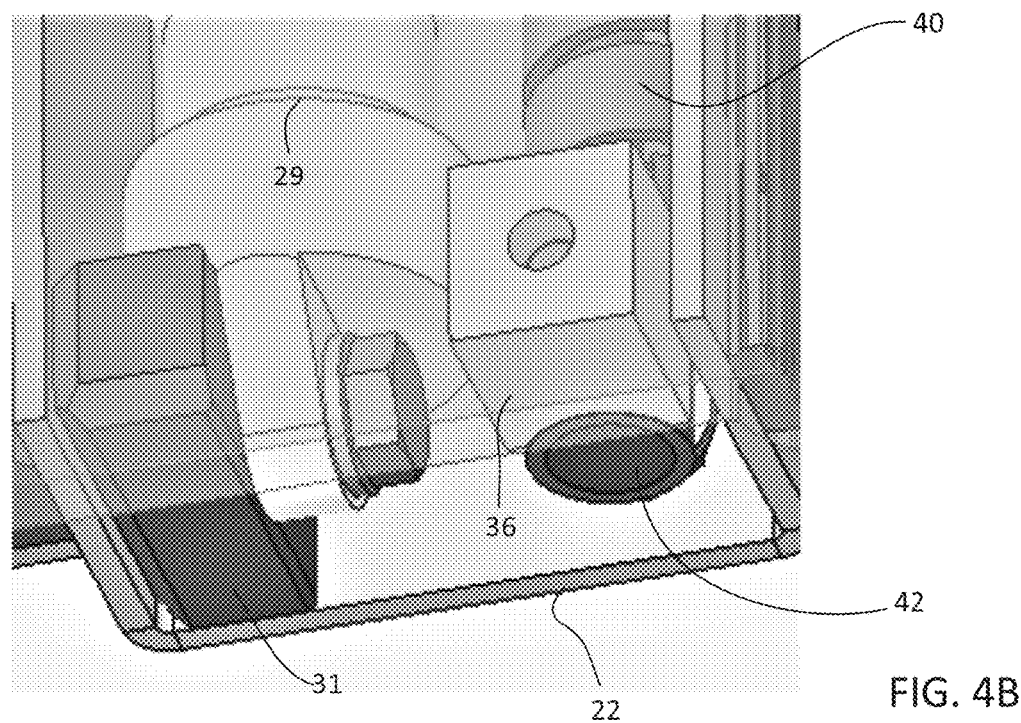

Reference is now made to FIG. 4A and FIG. 4B, which show further details of seat mount 36 and base mount 31, in accordance with some embodiments. Damper 29 is shown bolted to base mount 31. Base mount 31 is attached to frame 22 that is attached to the base frame formed by plate 27, struts 16 and plate 28 (not shown). Energy-absorbing arrangement 23 includes fuse 42 and helical ribbon 40 through which a bolt both attaches energy-absorbing arrangement 23 to seat mount 36. Seat mount 36 attaches to the seat frame. The seat frame is formed by plate 13 attached to back 15 and the other side of plate 13 attached to two slide rails 21 that are slide-ably attached to four linear slider bearings 26 (not shown).

Figures 5A, 5B:
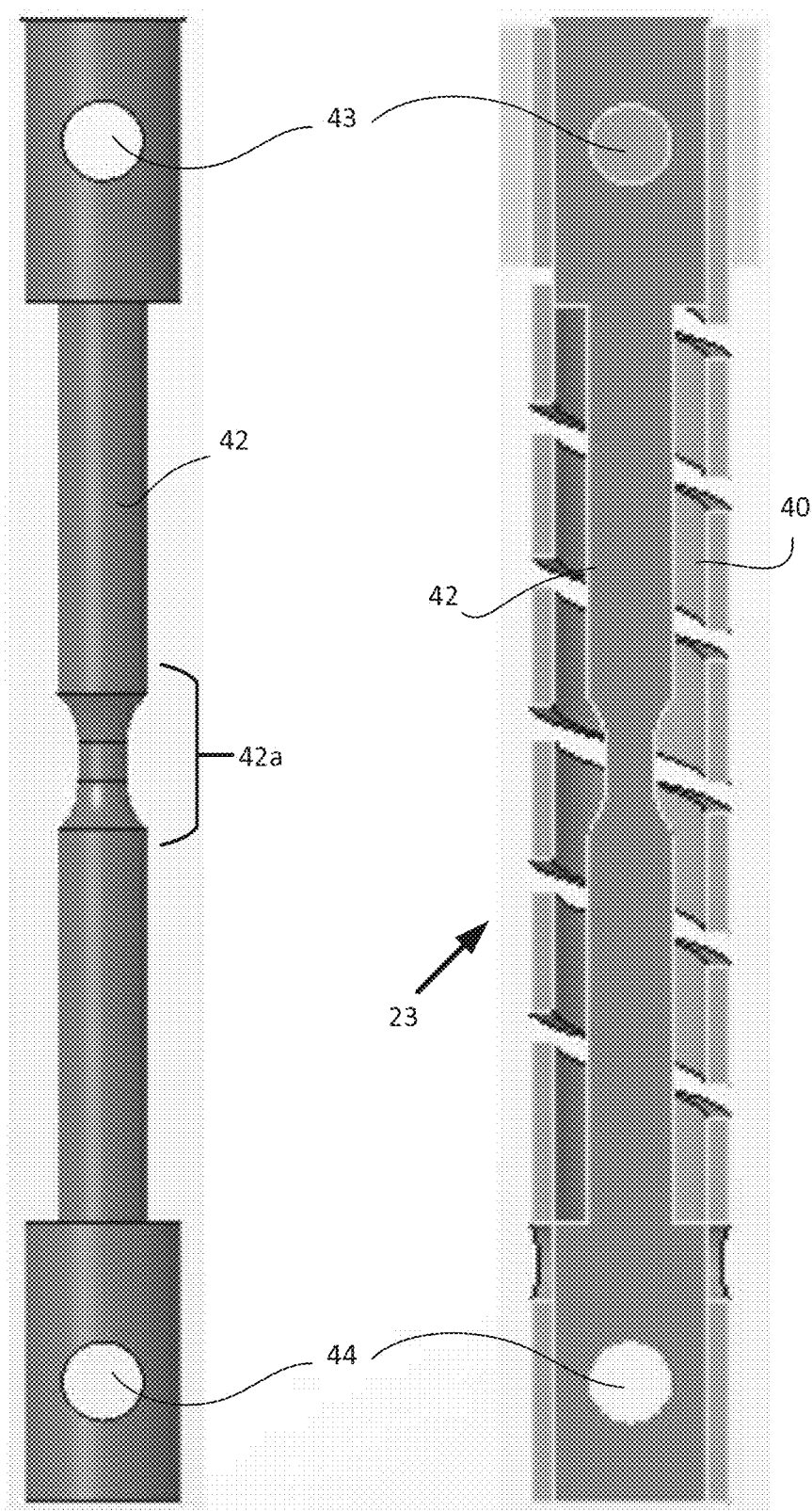
FIG. 5A shows further details of a fuse, in accordance with some embodiments.
FIG. 5B shows further cross sectional details of a fuse and a spiral, in accordance with some embodiments.

Reference is now made to FIG. 5A, which shows further details of fuse 42, in accordance with some embodiments. Fuse 42 is designed as a rod with a neck 42a machined out in the middle of the rod. The rod diameter and neck 42a are chosen so that fuse 42 breaks when a load applied to helical ribbon 40 and fuse 42 is over 10G for example. Fuse 42 allows for the conservation of space as it is placed inside helical ribbon 40 and the same connections 43 and 44 used for helical ribbon 40 are used for fuse 42.

Reference is now made to FIG. 5B, which shows further cross sectional details of fuse 42 and helical ribbon 40, in accordance with some embodiments. Fuse 42 is placed inside helical ribbon 40 and the same connections 43 and 44 are used for helical ribbon 40 and for fuse 42. Fuse 42 is placed inside helical ribbon 40 allows for the conservation of space inside for mechanism 30 disposed between the base frame and the seat frame of vehicular seat 10.

Figure 6A:
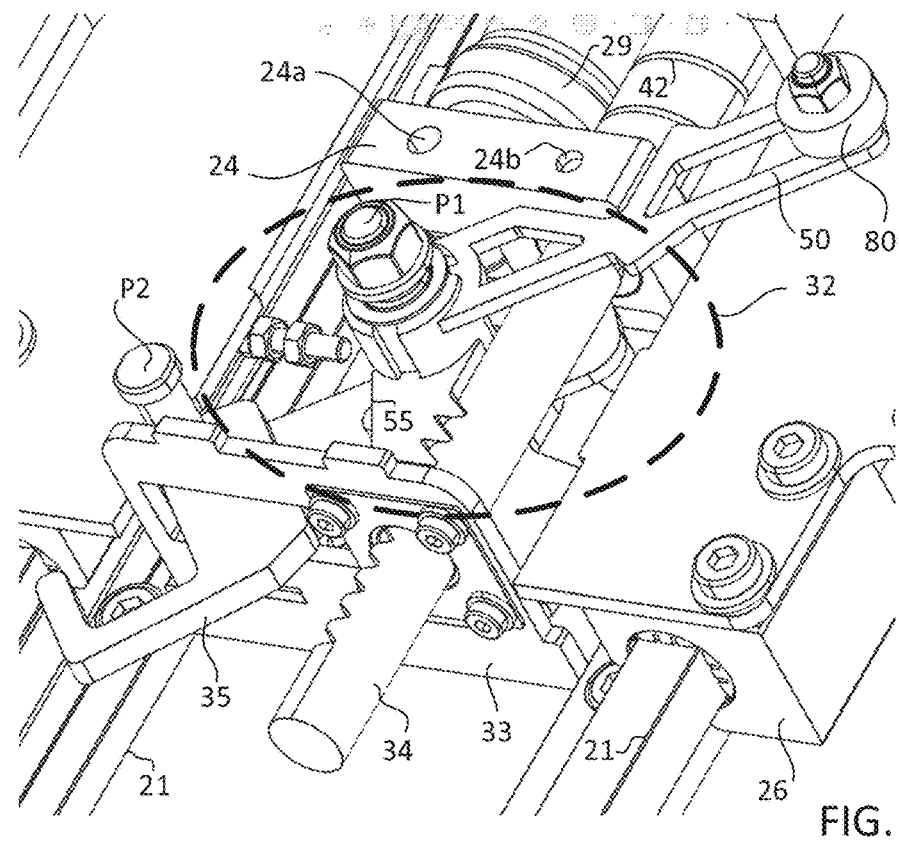
FIG. 6A shows the in situ details of a locking mechanism, in accordance with some embodiments.

Reference is now made to FIG. 6A which shows the in situ details of locking mechanism 32, in accordance with some embodiments. The in situ details of locking mechanism 32 are shown with a portion of plate 27 removed. The portion of plate 27 is removable and re attachable to the remaining portion of plate 27. As described above, slider bearings 26 on one side attach to plate 27 and the other side to sliders 21, and struts 16 are attached to plate 27. Pivot P1 is perpendicularly attached through the base frame. Pivot point P1 is centrally located and mounted through plates 22 and 27 above arm 24. The base frame includes plate 22 (not shown but shown in FIG. 2A) and the portion of plate 27 (removed). A slot in the side of the portion of plate 27 enables the up and down movement of locking arm 50. The slot allows for the position of mass 80 to be changed in order for a moment provided by mass 80 to be higher or lower than a moment provided by spring 52 (not shown) attached at one end to pivot P1 and the other end to a lug 54 located near to pivot P2. Pivot P2 is located further up towards plate 33 and is laterally offset from centrally located pivot P1. Pivot P2 is perpendicularly attached through the base frame.

Locking arm 50 is rotationally attached to pivot P1 at one end, at the other end of locking arm 50 is mass 80. Mass 80 is slide-ably attachable to a slot in locking arm 50 by use of nut and bolt. L plate 55 is rotationally attached at the elbow (not shown) of L plate 55 to pivot P1. A linear toothed pawl portion of L plate 55 on an interior arm of L plate 55 is shown engaged with a corresponding toothed portion of bar 34. The engagement between L plate 55 and bar 34 may be a frictional one such as clutch type of surface may be provided on L plate 55 and bar 34. Bar 34 protrudes and is linearly moveable through plate 33. Plate 33 is attached perpendicular to plate 22 on three sides and to plate 27 on one side. One end of damper 29 is attached to arm 24 at attachment point 24a. Similarly, helical ribbon 40 and fuse 42 are attached at attachment point 24b. Bar 34 may be an integral part of fuse 42 or may be attached to attachment point 24b. Wedge 35 rotationally attached to pivot P2 and is rotatable through the aperture of the top plate 33.

Figure 6B:
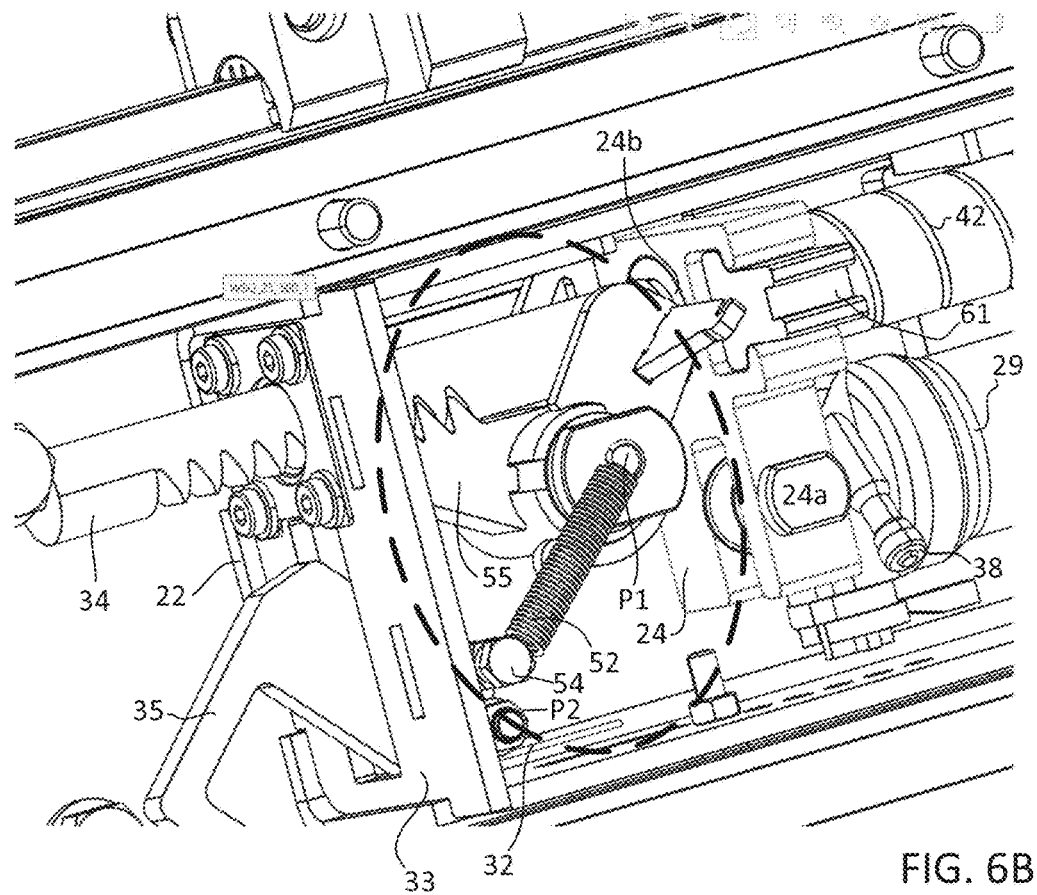
FIG. 6B shows the in situ details of locking mechanism 32 from the opposite of that shown in FIG. 6A, in accordance with some embodiments.

Reference is now made to FIG. 6B which shows the in situ details of locking mechanism 32 from the opposite of that shown in FIG. 6A, in accordance with some embodiments. Spring 52 is attached at one end to pivot P1 and the other end to a lug 54 located near to pivot P2. A slot in the side of the portion of plate 27 (not shown) enables the up and down movement of locking arm 50 (not shown). The slot allows for the position of mass 80 (not shown) to be changed in order for a moment provided by mass 80 to be higher or lower than a moment provided by spring 52 attached at one end to pivot P1 and the other end to a lug 54 located near to pivot P2. Wedge 35 rotationally attaches to pivot P2 and is rotatable through the aperture of the top plate 33. A toothed portion of L plate 55 on an interior arm of L plate 55 is shown engaged with a corresponding toothed portion of bar 34. Bar 34 protrudes and is linearly moveable through plate 33. L plate (55) is rotationally attached at the elbow of the L plate 55 to pivot P1. Damper 29 is attached to arm 24 at attachment point 24a. Similarly, helical ribbon 40 and fuse 42 are attached at attachment point 24b. Attachment point 24b includes a dovetail slide receiver portion for which dovetail 61 on one-side slides into. The opposite side of dovetail 61 attaches to plate 27 (not shown). Valve 38 of damper 29 enables the configuration of the suspension feature of vehicular seat 10 for when a vehicle is travelling off road for example.

Figure 7A:
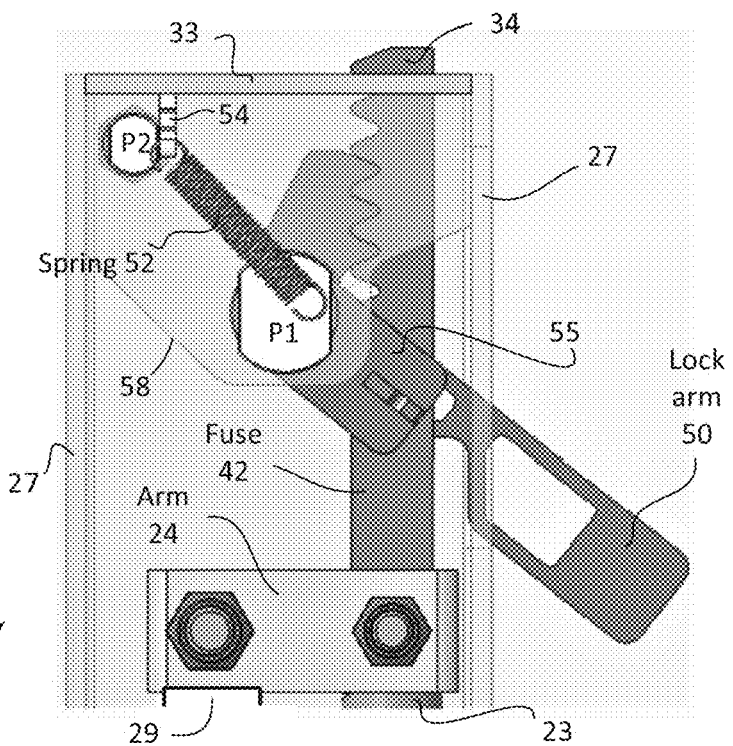
FIG. 7A shows further details of a locking mechanism in its locked position, in accordance with some embodiments.

Reference is now made to FIG. 7A which shows further details of locking mechanism 32, in its locked position, in accordance with some embodiments. A partial top portion of damper 29 is shown bolted to arm 24. A partial top portion of energy-absorbing arrangement 23 is shown bolted to arm 24. Bar 34 is attached to the top of energy-absorbing arrangement 23. Bar 34 may be of square section and include a teeth portion. Locking arm 50 and L plate 55 rotates about pivot point P1. Spring 51 connects between L plate 55 and lug 54. The teethed portion of L plate 55 is shown engaged with the teeth portion of bar 34. Pivot points P1 and P2 are attached perpendicular to plate 58. Plate 58 attaches perpendicularly to plate 33.

An engagement of the toothed portion of L plate 55 with the tooth portion of bar 32 may occur when the vehicle encounters an explosion. The engagement enables the energy absorption properties of helical ribbon 42 and the integral fuse 40 instead of the suspension feature provided through damper 29. The integral fuse 42 breaks when the load from the explosion applied to the helical ribbon 40 exceeds an acceleration of 10Gs of the longitudinal upward and downward movement of the seat frame which includes plate 13 and slide rails 21. Helical ribbon 40 may be implementable with a material that is plastically and/or elastically deformable. The plastically or elastically deformable absorbing element for helical ribbon 40 may be chosen or designed in response to stresses greater than a predetermined threshold. The predetermined threshold being responsive to an excess of the acceleration of 10Gs of the longitudinal upward and downward movement of the seat frame. Helical ribbon 40 may be designed to operate subsequently to the explosion as a compressible element or an extendable element until fuse 42 and helical ribbon 40 are replaced. The ribbon or ribbons of helical ribbon 40 that undergo a plastic deformation may be designed to extend or compress at stress level controllable by the length, pitch, cross section, and material of the ribbon or ribbons.

Figure 7B:
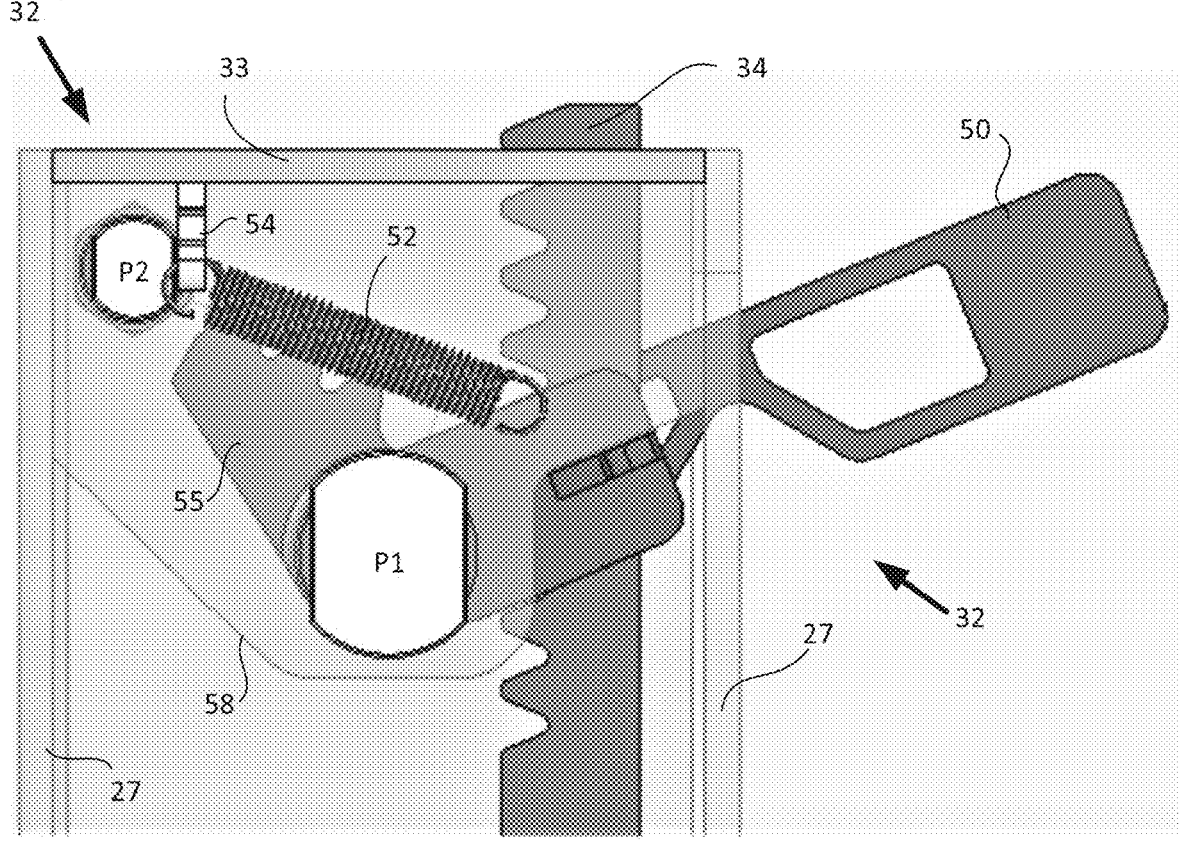
FIG. 7B shows further details of a locking mechanism 32 in its unlocked position, in accordance with some embodiments.

Reference is now made to FIG. 7B which shows further details of locking mechanism 32, in its unlocked position, in accordance with some embodiments. In the unlocked position, locking arm 50 is located upwards and held in place by spring 52 and the teethed portion of L plate 55 is shown disengaged with the teeth portion of bar 34. With the disengagement of L plate 55 from bar 34, the normal use of providing a suspension feature to vehicular seat 10 via damper 39 continues.

Figure 8A:
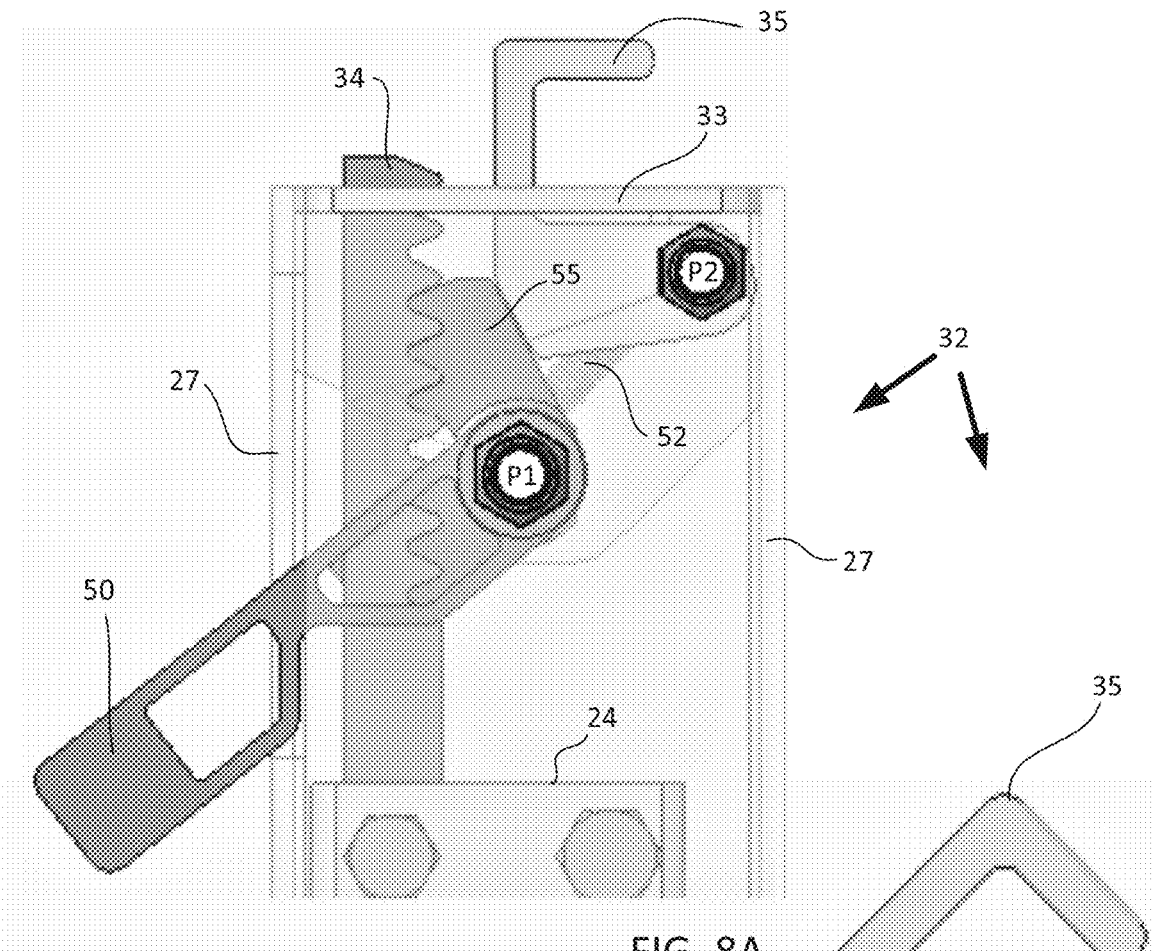
FIG. 8A shows further details of a locking mechanism, in accordance with some embodiments.

Reference is now made to FIG. 8A which shows further details of locking mechanism 32, in its locked position, in accordance with some embodiments. FIG. 8A shows the other side of locking mechanism 32 show in FIG. 7A. A partial top portion of damper 29 is shown bolted to arm 24. A partial top portion of energy-absorbing arrangement 23 is shown bolted to arm 24. Bar 34 is attached to the top of energy-absorbing arrangement 23. Bar 34 may be of square section and include a teeth portion. Locking arm 50 and L plate 55 rotates about pivot point P1. Spring 51 connects between L plate 55 and lug 54. The teethed portion of L plate 55 is shown engaged with the teeth portion of bar 34. Pivot points P1 and P2 are attached perpendicular to plate 58. Plate 58 attaches perpendicularly to plate 33. Additionally included is wedge 35 that rotates about pivot point P2 and is shown dropped down so as to further secure L plate 55 into its locked position or "closed position". Wedge 35 ensures the ongoing locked position of L plate 55 during an explosion. The teethed portion of L plate 55 correspond to the teeth of bar 34 so that when L plate 55 is placed in the "closed" position, L plate 55 is locked into the teeth of bar 34 and locks the suspension mechanism provided by damper 29 in place.

Locking arm 50 has a certain amount of mass at its end (not shown) opposite pivot P1. The moment provided by spring 52 is higher than the moment provided by the mass 80 of locking arm 50 under normal conditions. If an explosion happens and the G-force on mass 80 increases to over 4G, the moment of the mass becomes greater than the moment from spring 52 to cause L plate 55 to rotate and lock into bar 34. Wedge 35 ensures the ongoing locked position of L plate 55 during the explosion to ensure that an energy absorption mechanism provided by energy-absorbing arrangement 23 is fully utilized.

Figure 8B:
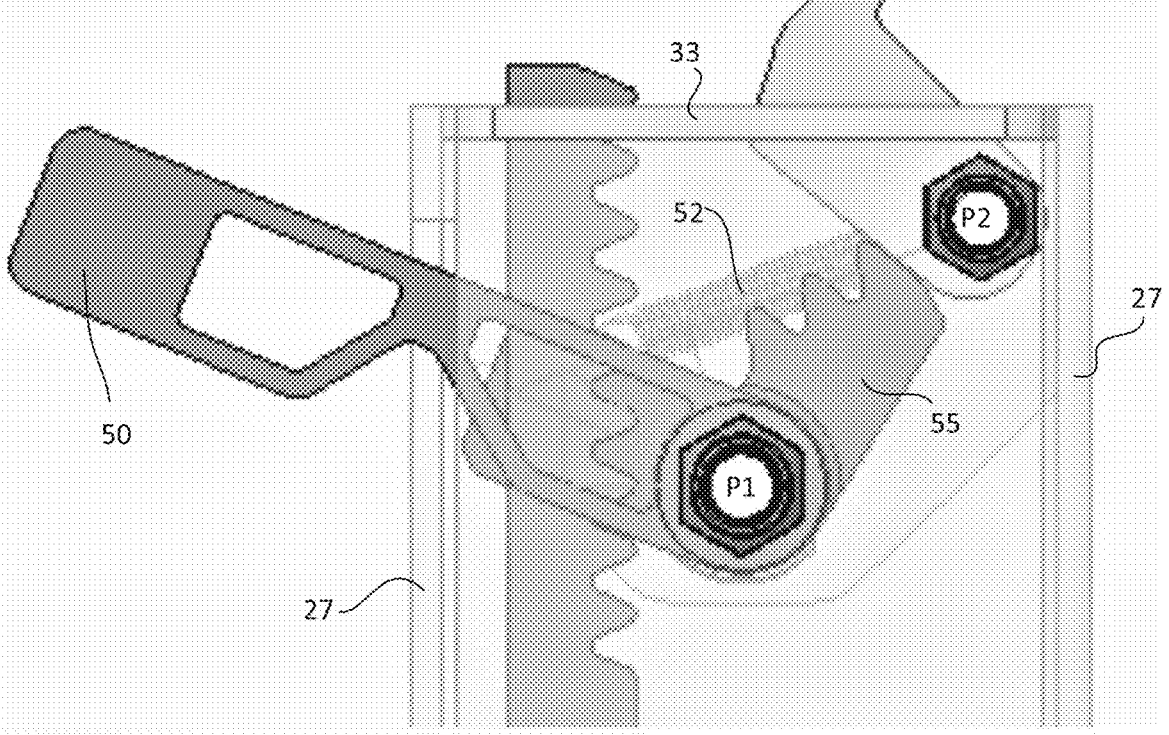
FIG. 8B shows further details of a locking mechanism, in accordance with some embodiments.

Reference is now made to FIG. 8B which shows further details of locking mechanism 32, in its unlocked position, in accordance with some embodiments. In the unlocked position, locking arm 50 is located upwards and held in place by spring 52 and the teethed portion of L plate 55 is shown disengaged with the teeth portion of bar 34 and wedge 35 is also disengaged. With the disengagement of L plate 55 from bar 34, the normal use of providing a suspension feature to vehicular seat 10 via damper 39 continues.

Figure 9A:
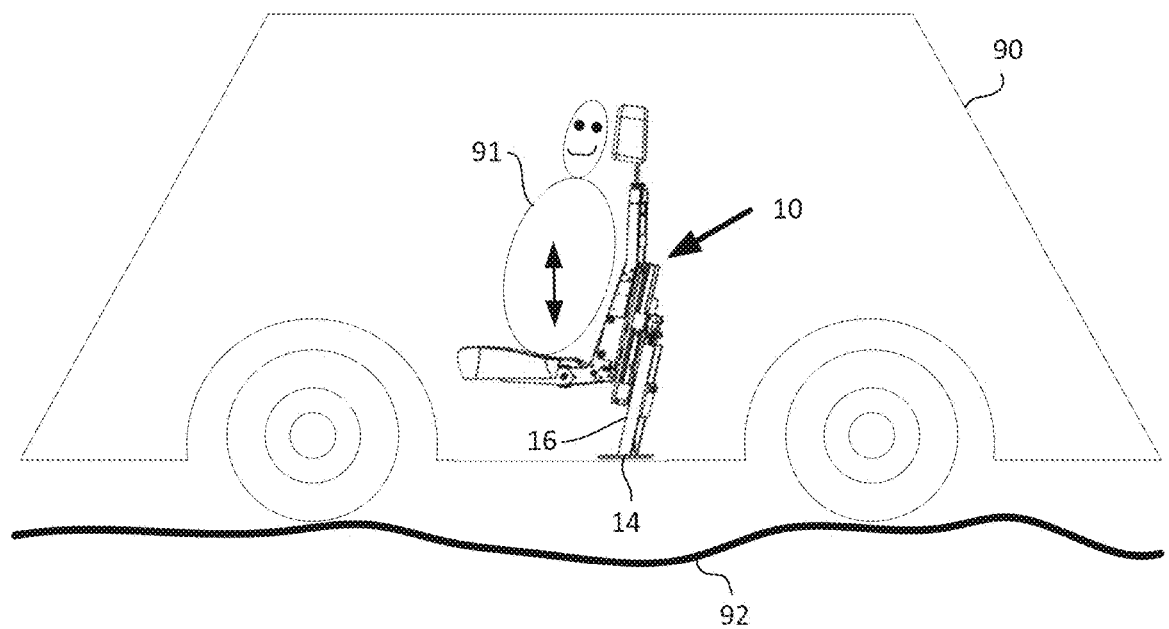
FIG. 9A which shows the utilization of a vehicular seat in an armored vehicle, in accordance with some embodiments.
Figure 9B:
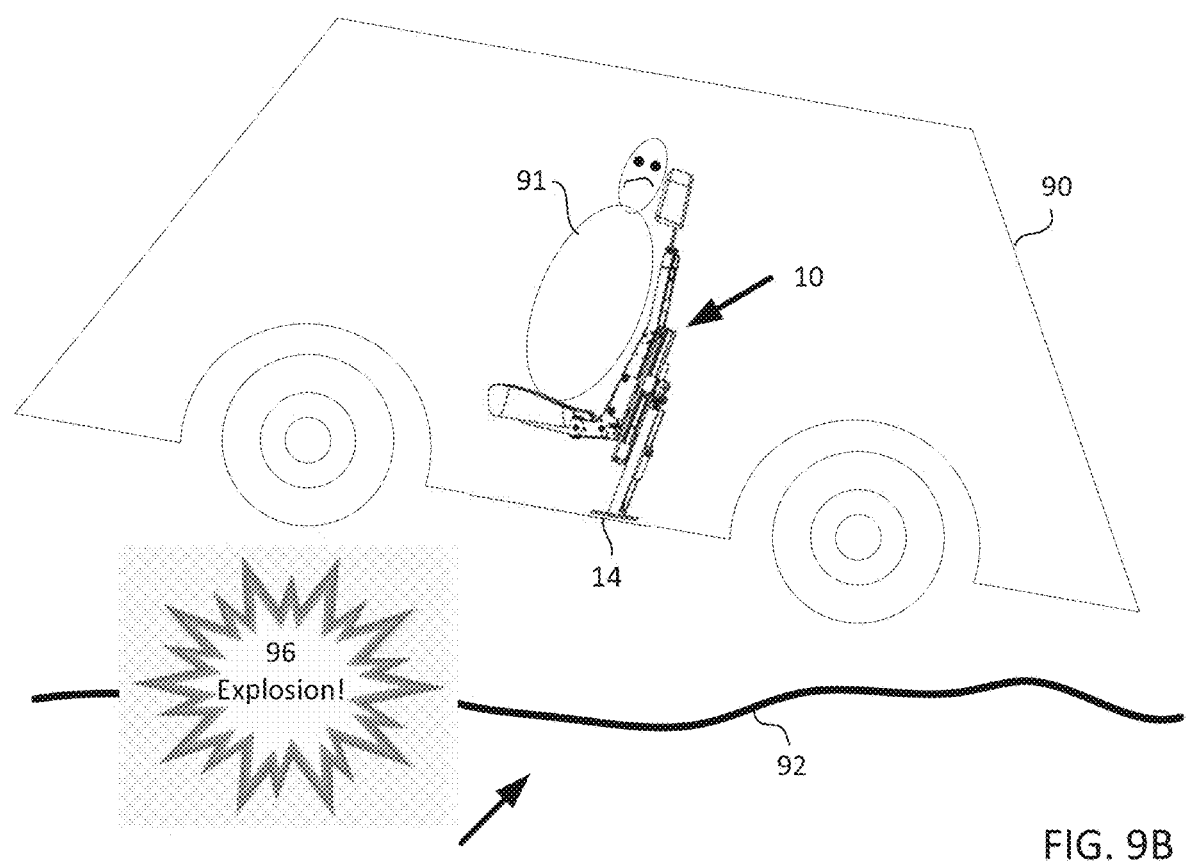
FIG. 9B shows the utilization of a vehicular seat in an armored vehicle, in accordance with some embodiments.

Reference is now made to FIG. 9A which shows the utilization of vehicular seat 10 in an armored vehicle 90, in accordance with some embodiments. Struts 16 vehicular seat 10 are attached to the floor of armored vehicle 90 by base plate 14. A security person 91 is sat in the seat of vehicular seat 10. Armored vehicle 90 is shown travelling across a typical off road surface 92. As described above, the bottom part of damper 29 is attached to the base frame and the top part of damper 29 is attached to arm 24 where the top part helical ribbon 40 and fuse 42 also connect. The bottom of helical ribbon 40 and fuse 42 connect to the seat frame. Arm 24 connects through locking mechanism 32. During day-to-day motion of vehicular seat 10, fuse 42 and helical ribbon 40 are intact and all the load from seat 18 and the security person 91 for example, goes through damper 29 to provide a suspension feature of vehicular seat 10. The suspension feature allows the longitudinal linear movement of arm 24 and energy-absorbing arrangement 23 to go up and down without the energy absorbing properties of fuse 42 and helical ribbon 40 being engaged. The suspension feature therefore, provides the benefit of off road comfort to a security person 91 from vibrations occurring due to travelling in off-road surface 92 conditions Reference is now made to FIG. 9B which shows the utilization of vehicular seat 10 in an armored vehicle 90, in accordance with some embodiments. Armored vehicle 90 is shown travelling across a typical off road surface 92. However, when there is an explosion 96 near the armored vehicle 90, the moment provided by the spring 52 is lower than the moment provided by the mass 80 attached at the end of locking arm 50 in locking mechanism 32. Consequently, L plate 55 is rotated at the elbow of L plate 55 at pivot P1 to provide an engagement of the toothed portion of L plate 55 with the tooth portion of bar 32. Wedge 35 is rotatable about pivot P2 and falls to further lock the engagement. The engagement enables the energy absorption properties of the spiral 42 and the integral fuse 40 instead of the suspension feature provided through damper 29. The engagement may be achieved when an acceleration of mass 80 of locking arm 50 is greater than 4Gs. The integral fuse 42 breaks when the load from the explosion applied to the helical ribbon 40 exceeds an acceleration of 10Gs of the longitudinal upward and downward movement of the seat frame which includes plate 13 and slide rails 21.

Helical ribbon 40 may be implementable with a material that is plastically or elastically deformable. The plastically or elastically deformable energy absorbing element for helical ribbon 40 may be chosen or designed in response to stresses greater than a predetermined threshold. The predetermined threshold being responsive to an excess of the acceleration of 10Gs of the longitudinal upward and downward movement of the seat frame with the security person 91 sat in vehicular seat 10. Helical ribbon 40 may be designed to operate subsequently to the explosion as a compressible element or an extendable element until fuse 42 and helical ribbon 40 are replaced at some later stage. The ribbon or ribbons of helical ribbon 40 may undergo a plastic or elastic deformation. The plastic or elastic deformation may be designed to extend or compress at stress level controllable by the length, pitch, cross section, and material of the ribbon or ribbons.

Therefore, locking mechanism 32 fixes the seat frame to the base frame if an explosion occurs. During the explosion, locking mechanism 30 locks the teeth of L plate 55 to the teeth of bar 32 so that the energy absorption properties of damper 29 are no longer utilized. The explosion 96 may cause fuse 42 to break and so locking mechanism 32 locks the longitudinal upward and downward movement of seat 18, by fixing arm 24 to the base frame. When damper 29 is locked in place, all the load goes through fuse 42 and helical ribbon 40 to fully activate and engage the energy absorbing mechanism provided by energy-absorbing arrangement 23 attached to arm 24 and seat mount 36 of vehicular seat 10. Therefore, an engagement of the teeth of L plate 55 with the teeth of bar 32 enables a switch from using damper 29, where the engagement is disengaged, to the use of the energy absorption properties of the energy-absorbing arrangement 23.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed:

1. A mechanism disposed between a frame structure and a base structure, the mechanism comprising:
    a damper including a piston rod, wherein the damper is mechanically connected between the frame structure and the base structure in a normal mode of operation, wherein the damper enables a longitudinal and suspended upward and downward movement of the frame perpendicular to a plane;
    an energy-absorbing arrangement comprising:

a plastically deformable absorbing element, wherein the plastically deformable absorbing element is adapted to plastically deform in response to stresses greater than a predetermined threshold stress along an axis perpendicular to the plane;

a bar mechanically attached to the plastically deformable absorbing element and having a first engagement portion;

a locking mechanism attached to the frame structure, wherein the locking mechanism comprises:

a pivot perpendicularly attached through the base structure;

a plate including a second engagement portion rotationally attached to the pivot, wherein responsive to an explosion the plate is rotated about the pivot to provide an engagement of the second engagement portion with the first engagement portion to switch from the normal mode of operation to an abnormal mode of operation, wherein in the abnormal mode of operation the energy-absorbing arrangement is operatively connected between the frame structure and the base structure thereby, to utilize the energy absorption properties of the energy-absorbing arrangement.

2. The mechanism of claim 1, further comprising:

a locking arm rotationally attached to pivot, wherein the opposite of locking arm includes a mass;

a spring with one end attached to the pivot and another end attached to the frame structure;

a second pivot perpendicularly attached through the base structure and laterally offset from the pivot; and a wedge rotationally attached to the second pivot and rotatable through the aperture of a top plate of the frame structure, wherein the wedge further locks the engagement to utilize thereby the energy absorption properties of the energy-absorbing arrangement.

3. The mechanism of claim 1, wherein responsive to an explosion in an abnormal mode of operation, the moment provided by the spring is lower than the moment provided by the mass to enable the engagement.

4. The mechanism of claim 1, wherein the engagement is achieved when an acceleration of the mass is greater than 4Gs or by an adjustment of the engagement to any other acceleration value required.

5. The mechanism of claim 1, wherein an integral fuse of the energy-absorbing arrangement breaks when a load from the explosion exceeds an acceleration up to 20Gs, wherein the load is applied to a helical portion of the energy-absorbing arrangement.

6. The mechanism of claim 1, wherein the energy-absorbing arrangement is plastically or elastically deformable in response to stresses greater than a predetermined threshold stress, wherein the energy-absorbing arrangement is at least one of a compressible element or an extendable element, wherein a helical ribbon of the energy-absorbing arrangement undergoes a deformation to an extent and at a stress level controllable by the length, pitch, cross section, and material of the helical ribbon.

7. The mechanism of claim 1, wherein during the abnormal mode of operation the energy absorption of the energy-absorbing arrangement takes over the action of the damper.

8. The mechanism of claim 1, wherein in the normal mode of operation a suspension feature is provided to a load mass attached to frame structure responsive to the damper.

9. The mechanism of claim 1, wherein the load mass is at least one of a seat and passenger of an armored vehicle.

10. The mechanism of claim 1, wherein the first engagement portion and the second engagement portion are a linear gear rack and a pawl respectively.

* * * * *